(12) United States Patent
Mühlbauer

(10) Patent No.: US 6,196,801 B1
(45) Date of Patent: Mar. 6, 2001

(54) ADJUSTABLE PROPELLER UNIT WHICH CAN BE HYDRAULICALLY REVERSED

(75) Inventor: Gerd Mühlbauer, Rain (DE)

(73) Assignee: Mühlbauer Luftfahrttechnik GmbH, Rain (DE)

( * ) Notice: Subject to any disclaimer, the term of this patent is extended or adjusted under 35 U.S.C. 154(b) by 0 days.

(21) Appl. No.: 09/319,089

(22) PCT Filed: Oct. 2, 1998

(86) PCT No.: PCT/DE98/02963

§ 371 Date: May 28, 1999

§ 102(e) Date: May 28, 1999

(87) PCT Pub. No.: WO99/17985

PCT Pub. Date: Apr. 15, 1999

(30) Foreign Application Priority Data

Oct. 2, 1997 (DE) .............................................. 197 43 739

(51) Int. Cl.[7] ...................................................... B63H 1/06
(52) U.S. Cl. ........................... 416/157 R; 416/44; 416/46
(58) Field of Search ............................... 416/157 R, 156, 416/31, 44, 46, 52

(56) References Cited

U.S. PATENT DOCUMENTS 3,380,535   4/1968   Biermann .

4,097,189   6/1978   Harlamert .

FOREIGN PATENT DOCUMENTS 196 00 660   7/1997   (DE) .

Primary Examiner—Edward K. Look
Assistant Examiner—Hermes Rodriguez
(74) Attorney, Agent, or Firm—Collard & Roe, P.C.

(57) ABSTRACT

A hydraulically reversible, adjustable propeller unit for aircraft, land vehicles and watercraft, with a propeller with at least two blades, the pitch of which is controllable by means of a control unit (controller), whereby a hydraulic connection exists between the rotating propeller and the stationary control unit for controlling the blade pitch, with a spring-preloaded piston actuated by means of a hydraulic fluid, and with adjustable mechanical stop means for the start position, the brake position and the cruising or sailing position, whereby the piston is designed as a spring-preloaded double piston consisting of an inner piston and a ring piston arranged around the inner piston, said two pistons being lockable with each other by means of a centrifugal-force locking mechanism; the stop means for the start position is designed for limiting the setting range of the locked double piston in order to prevent unintentional reversing at speeds above about 1500 rpm; and the brake position can be reached only when the inner piston is unlocked and the propeller revolutions are below about 1500 rpm when the propeller controller is in the high-pressure range.

5 Claims, 5 Drawing Sheets

ADJUSTABLE PROPELLER UNIT WHICH CAN BE HYDRAULICALLY REVERSED

The invention relates to a hydraulically reversible, adjustable propeller unit for aircraft, land vehicles and watercraft, with a propeller with at least two blades, the blade angle of which is controllable by means of a control unit (controller), whereby a hydraulic connection exists between the rotating propeller and the stationary control unit for controlling the pitch of the blade, with a spring-preloaded piston which can be actuated by means of hydraulic fluid, and adjustable mechanical stop means for the start position, the brake position and/or cruise/sailing position, according to the introductory part of claim 1.

Preferably propellers with a hydraulic system for reversing thrust (reversible propellers) are employed for reducing the landing distance of aircraft or for enhancing the maneuverability of dirigibles, amphibious aircraft or hovercrafts. Various known devices and methods are available for said purposes. Said known devices and methods offer certain advantages, for example stepless preselection of the pitch angle and of the associated engine output in the so-called beta-range (blade angle flatter than for the start position) by means of only one power control lever. However, such devices also have considerable drawbacks, for example a costly device for adjusting the pitch angle, which is set via an adjustable hydraulic valve which constantly has to be in connection with the rotating propeller. With many known power plants, such known systems can be installed only with disproportionately high expenditure. Failures on such a device represent a high safety risk both in flight and ground operations.

In connection with a known hydraulically reversible, adjustable propeller unit (DE 19600660), provision is made for a stop means for the start position. Said stop device is preloaded by means of disk springs and can be overcome by setting the pitch angle to the brake position (reverse) by means of a high-pressure hydraulic fluid, and is adjustable up to a mechanical stop device for the brake position (reverse) in order to produce a negative thrust.

Such a device makes a constant direct connection between the rotating propeller and the control unit (controller)—which is normally installed on the casing of the power plant—superfluous. In the event of any loss of pressure, the blades are automatically reset from the negative pitch angle to a positive pitch angle in order to assure normal operation.

It has been found, however, that the disk springs exhibit a tendency to corrosion in certain applications of the adjustable propeller unit, for example in watercraft, which impairs the operating mode of the adjustable propeller unit.

Therefore, the problem of the invention is to further develop a hydraulically reversible, adjustable propeller unit of the type specified above in such a way that the operating safety is increased also when such a unit is operated in wet or aggressive environments.

Said problem is solved by the invention characterized in claim 1, i.e., in that the piston is constructed as a spring-preloaded double piston consisting of an inner piston and a ring piston arranged around the inner piston, said two pistons being lockable with each other by means of a centrifugal-force locking mechanism; that the stop motion device for the start position is designed for limiting the setting range of the locked double piston in order to prevent unintentional reversing at numbers of revolution above about 1500 rpm; and that the brake position can be reached only when the inner piston is unlocked and the propeller revolutions are below about 1500 rpm when the propeller controller is in the high-pressure range.

With the adjustable propeller unit as defined by the invention it is possible to omit the disk springs of the known adjustable propeller unit because the propeller is set to reversing thrust by means of the inner piston arranged in the double piston, said inner piston being unlocked when a number of revolutions below about 1500 rpm is reached, so that the brake position can be reached with the propeller controller in the high-pressure range.

Advantageous further developments of the invention are specified in the dependent claims.

For example, according to another advantageous development of the invention, provision is made that the control unit (controller) is designed for generating two different servo-pressures comprising a normal pressure for positive thrust for normal forward operation of about 12 to 22 bar, and a high pressure of about 32 to 48 bar for negative thrust for braking operation (reversing).

A mechanical stop means for the start position is located in the boss of the propeller. The hydraulic control unit (controller) has two excess-pressure valves, by means of which a setting pressure of about 12 to 22 bar is generated for the double piston under normal operating conditions, and a setting pressure of about 32 to 48 bar is generated for the inner piston in reversing operations in order to adjust the propeller blades in the so-called beta-range up to negative pitch angles for the braking position. The high-pressure hydraulic fluid is uncontrolled in this process in order to prevent excess revolutions per minute.

According to another advantageous development of the invention, provision is made for an electrically or mechanically controllable switching valve for reversing the control unit from normal pressure to high pressure, or from high pressure to normal pressure.

According to yet another advantageous further development of the invention, provision is made in the control unit for a safety valve which, under normal operating conditions, limits the pressure to normal pressure in order to prevent unintentional reversing of the propeller.

Finally, according to yet another advantageous further development of the invention it is possible to make provision in the control unit in the high-pressure stage for a blade pitch controller permitting stepless setting of the blade pitch in the beta range in dependence of the servo-pressure.

It is possible with such an arrangement to control the hydraulic pressure associated with the blade pitch in order to achieve in this way stepless setting of the blade pitch in the beta range corresponding with the power plant output.

An exemplified embodiment of the invention is shown in the drawing and described in greater detail in the following. In the drawing, FIG. 1 is a sectional view of the propeller boss, whereby the adjustable propeller unit is in the position for a large pitch (sailing position).

Figure 1:
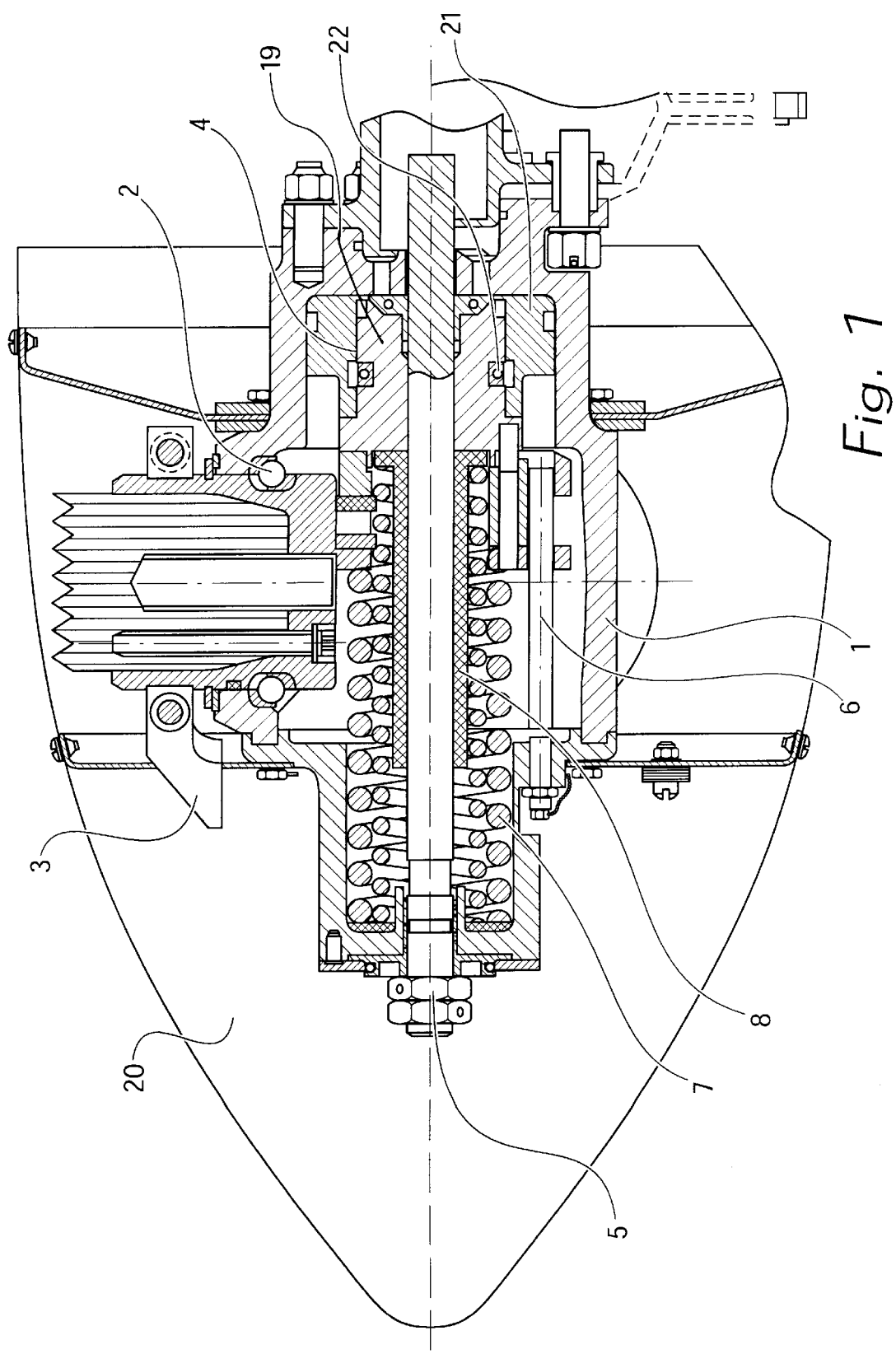
Figure 2:
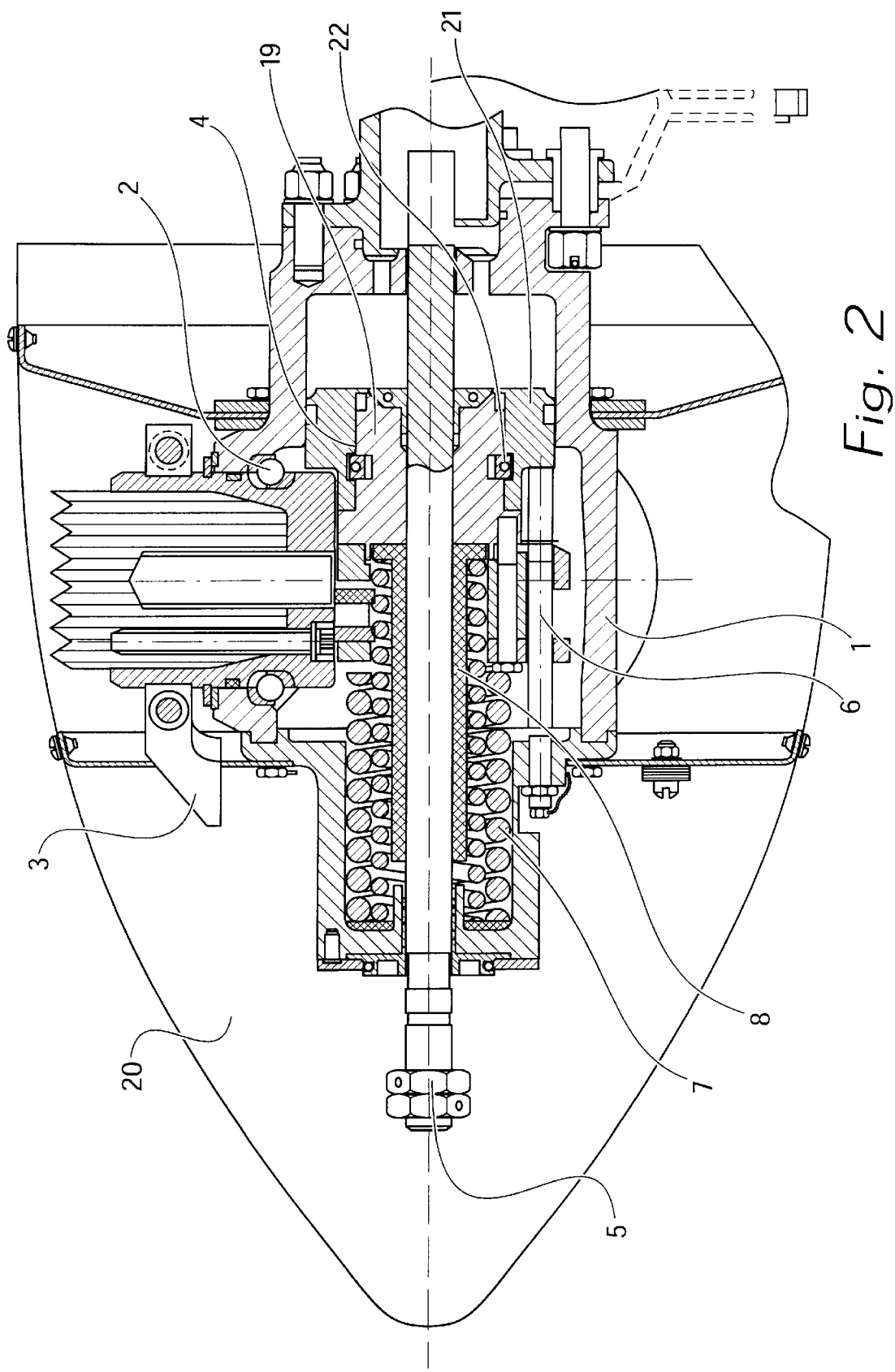
FIG. 2 is a sectional view of the propeller boss, whereby the adjustable propeller unit is in the start position.
Figure 3:
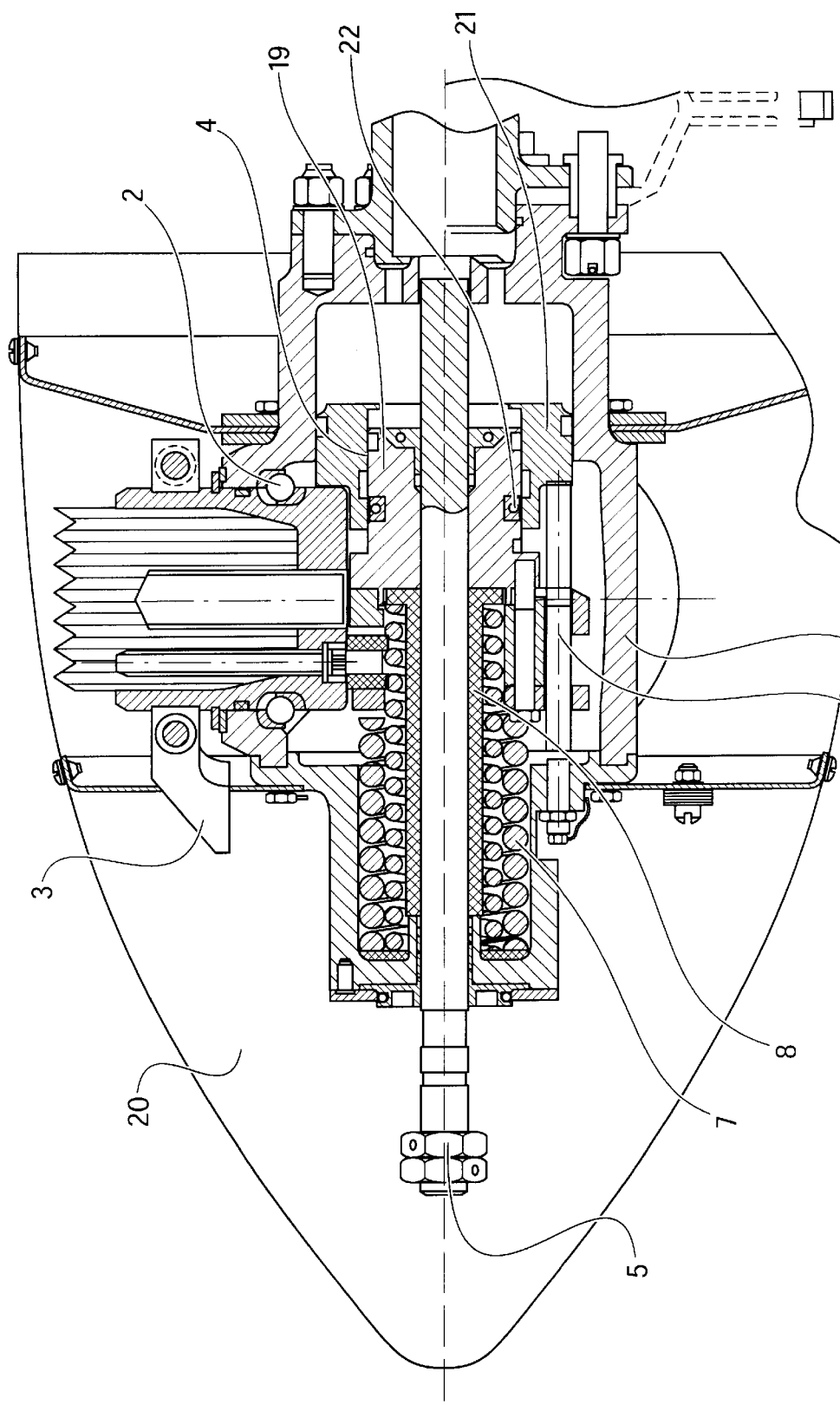
FIG. 3 is a sectional view of the propeller boss, whereby the adjustable propeller unit is in the brake position.

The adjustable propeller unit 20 shown in FIGS. 1 to 3 shows a possible design of a reversible and adjustable propeller with the important components of such a propeller, i.e., with a boss 1, at least two blade supports 2 for the propeller blades, fly weights 3, a servo-piston for the adjustment of the blade, a mechanical stop means 5 for the cruising or sailing position, a mechanical stop means 6 for the start position, coil springs 7, and with a mechanical stop means 8 for the brake position (reversing). Servo-piston 4 is designed as a double piston consisting of an inner piston 19 and a ring piston 21 arranged around said inner piston, said two pistons being lockable with each other by means of a centrifugal-force locking mechanism 22.

Figure 4A:
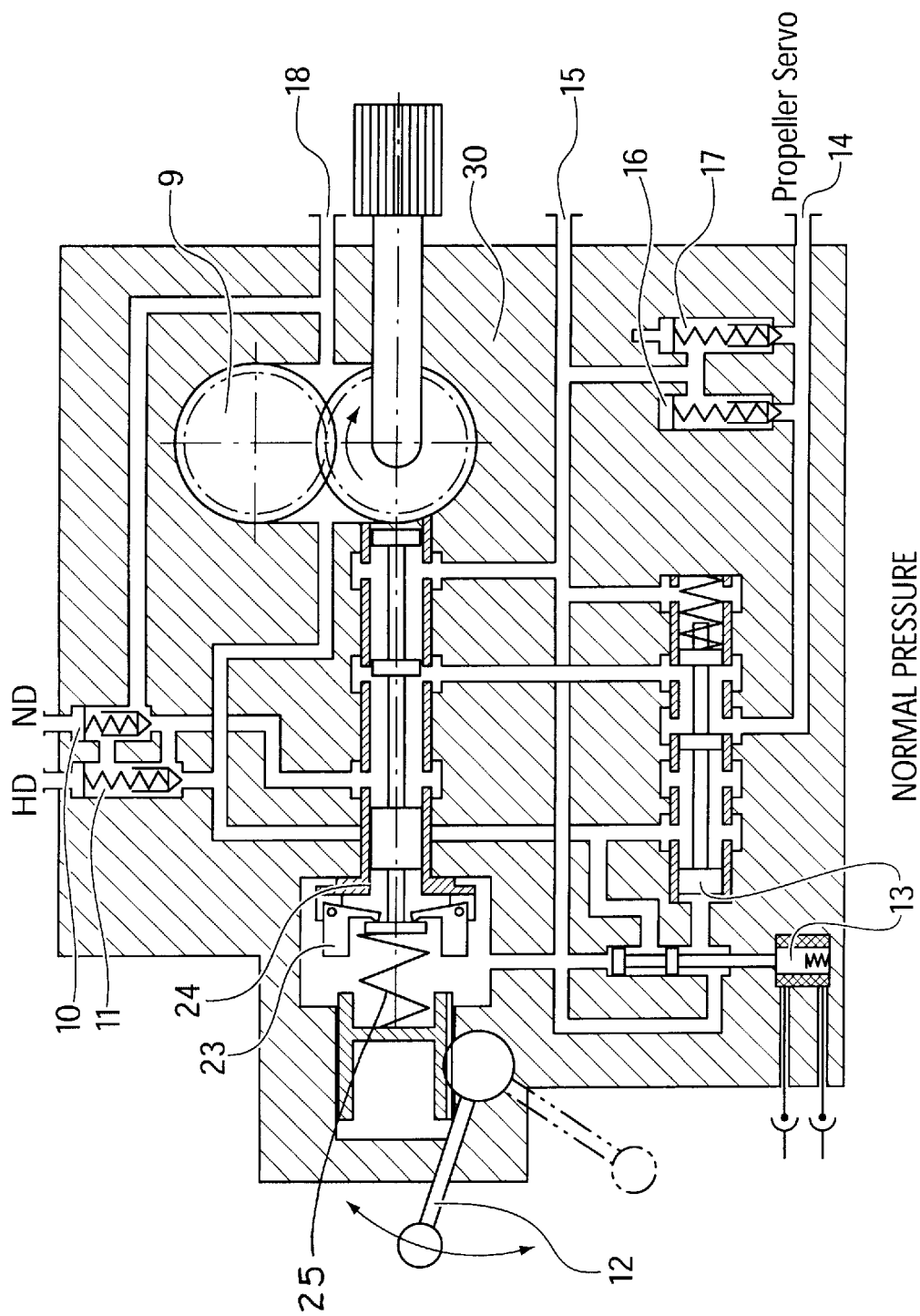
FIG. 4a is a schematic representation of the control unit in normal-pressure operation.
Figure 4B:
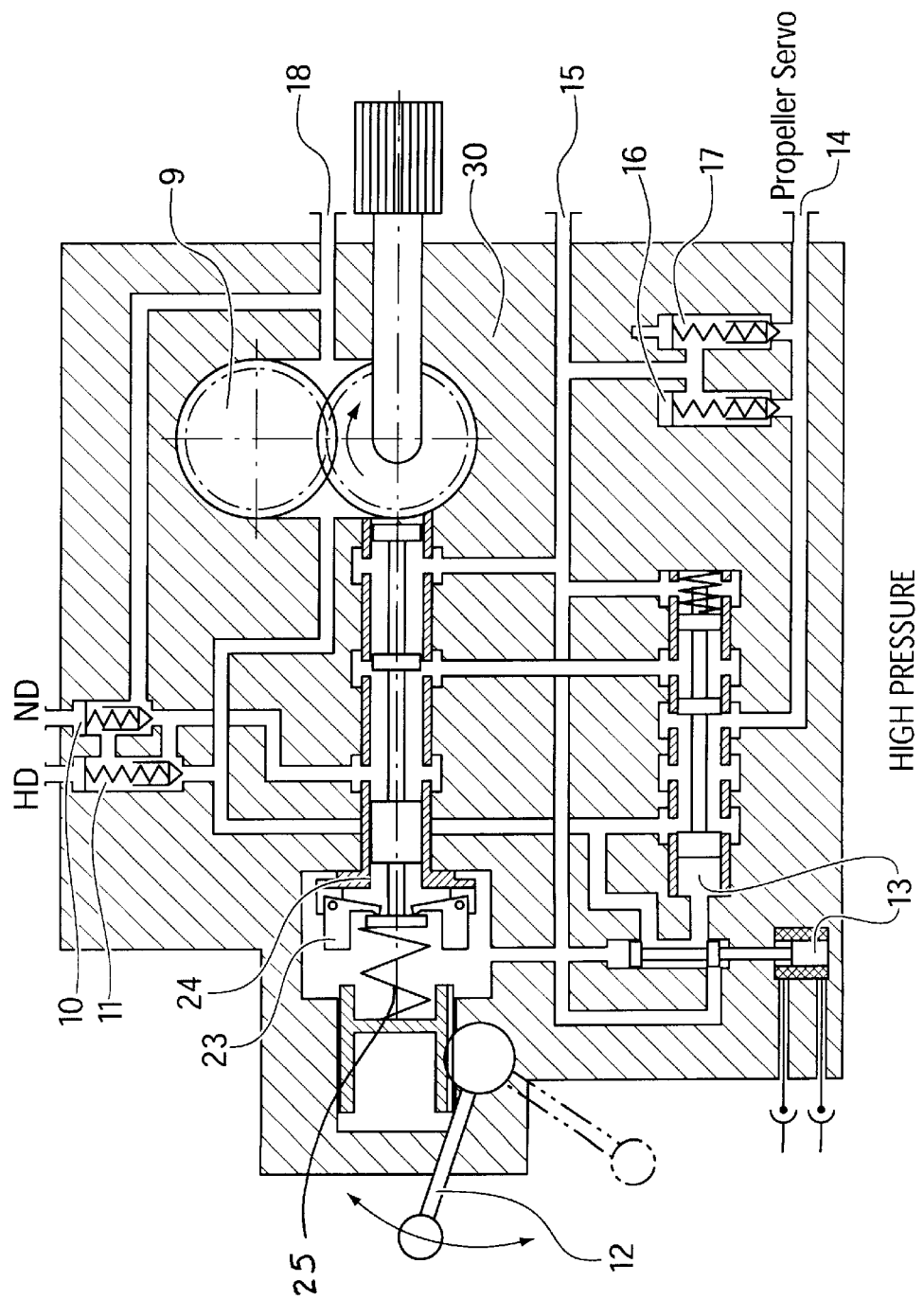
FIG. 4b is a schematic representation of the control unit in high-pressure operation.

The hydraulic control unit 30 shown in FIGS. 4a and 4b shows a hydraulic propeller controller for constant speed, with a pump 9, a normal-pressure valve 10, a high-pressure valve 11, a speed control unit with setting lever 12, a controller drive 24, a controller spring 25, fly weights 23, a switching valve 13 for normal or high pressure, a servo-pressure line leading to propeller 14, return lines leading to engine sump 15, a safety valve 16, a blade pitch controller 17, and with a supply line from engine 18.

The operating mode of the hydraulically reversible, adjustable propeller unit 20 is described in the following.

The control unit (controller) 30 according to FIGS. 4a and 4b supplies the hydraulic setting device, i.e., servo-piston 4 of propeller 20 with hydraulic fluid at two different pressures, which set the blades of the propeller via leaf supports 2 and fly weights 3—the latter being secured on said supports—in the direction of a small pitch )start position) as long as the controller is in the underrevving condition. During normal operation, control unit (controller) 30 supplies the normal pressure, which provides for a synchronous speed in the forward operation of the aircraft (vehicle) depending on the setting of the engine output. In this process, the hydraulic oil flows from pump 9 through high-pressure valve 11 to normal-pressure valve 10, and from there through the speed control unit to servo-pressure line 14 via switching valve 13. If the blade pitch is to be reduced, switching valve 13 is actuated and the normal-pressure line is blocked. The hydraulic oil now flows from pump 9 directly to switching valve 13, bypassing the speed control unit, and on to servo-pressure line 14.

A system in which the oil pressure is employed for reducing the pitch is known per se. The pitch of the blade can steplessly move in this connection between the adjustable mechanical stop means 6 for the start position and the adjustable mechanical stop means 5 for the cruising or sailing position.

Now, if a blade pitch flatter than the one for the start position is desired, for example for reducing the landing distance or for superior maneuverability on the ground or in the water, it must be possible to set the propeller blades flatter up to a negative blade pitch. This is accomplished according to the invention in that the servo-line for the first excess pressure valve 10 for normal pressure is closed via a switching valve 13, and the servo-line for the second excess pressure valve 11 for high pressure is opened, as described in the foregoing. Switching valve 13 is activated either electrically via a switch, or mechanically via a tackle-type control, which may be mounted on the power control lever.

Therefore, if the power control lever is pulled to idle and then pulled back via a blocking mechanism in the direction of the brake position (reverse), the high-pressure line is activated. Since the propeller is in the underrevving condition, the centrifugal-force locking mechanism is unlocked and releases the inner piston 19, which is then capable of moving up to the mechanical stop means 8 for the brake position (reverse). This causes the propeller blades to reach a negative blade pitch and to generate a corresponding braking thrust. The negative (braking) thrust is in this connection dependent upon the output of the engine. Said output has to be increased accordingly if the blades are present on the mechanical stop means 8 for the brake position (reverse). This is accomplished in the known manner by means of a cam disk in order to permit controlling of the engine for increasing the output also with a negative motion of the power lever.

Furthermore, it is advantageous that the high-pressure hydraulic fluid is not controlled via the speed (rpm) controller. Dangerous excessive numbers of revolutions are avoided in this way, which may occur with conventional brake setting systems if a number of revolutions of more than 90% of the starting speed (rpm) of the engine is reached.

Now, if setting from the brake position (reverse) back to the start position is to be accomplished, the engine power lever has to be set forward in the direction of idle until the blocking mechanism for the brake position has been overcome. This renders the high pressure servo-oil inactive and the blades are set again to the start position by means of spring force once the normal pressure has been adjusted again, whereby the centrifugal-force locking mechanism 22 locks inner piston 19 again with ring piston 21 as soon as the speed is increased again above about 1500 rpm.

This completes the brake-setting process.

The novel type of system as defined by the invention increases the operational safety while maintaining the same safety against unintentional setting of the brake position because a disk spring assembly—which is susceptible to corrosion—is dispensed with. This simplification reduced the weight, the number of components and thus the costs.

What is claimed is:

1. A hydraulically reversible, adjustable propeller unit for aircraft, land vehicles and watercraft, with a propeller with at least two blades, the blade pitch of which is controllable by means of a control unit, whereby a hydraulic connection exists between the rotating propeller and the stationary control unit for controlling the blade pitch, with a spring-preloaded piston which can be actuated by means of a hydraulic fluid in two different pressure ranges, and with adjustable mechanical stop means for the start position, the brake position and the cruising or sailing position, characterized in that the piston (4) is designed as a spring-preloaded double piston consisting of an inner piston (19) and a ring piston (21) arranged around the inner piston, said two pistons being lockable with each other by means of a centrifugal-force locking mechanism (22); that the stop means (6) for the start position is designed for limiting the setting range of the locked double piston (4) in order to prevent unintentional reversing at speeds above about 1500 rpm; and that the brake position can be reached only when the inner piston is unlocked and the propeller revolutions are below about 1500 rpm when the propeller controller is in the high-pressure range.

2. The hydraulically reversible, adjustable propeller unit according to claim 1, characterized in that the control unit (30) is designed for generating two different servo-pressures comprising a normal pressure of about 12 to 22 bar for positive thrust for normal forward operation, and a high pressure of about 32 to 48 bar for negative thrust for braking operation, whereby the high-pressure hydraulic fluid is uncontrolled in order to prevent excessive numbers of revolutions in the braking operation.

3. The hydraulically reversible, adjustable propeller unit according to claim 1, characterized in that provision is made for an electrically or mechanically controllable switching valve (13) for reversing the control unit (30) from normal pressure to high pressure, or from high pressure to normal pressure.

4. The hydraulically reversible, adjustable propeller unit according to claim 1, characterized in that provision is made in the control unit (30) for a safety valve (16), said safety valve limiting the pressure in normal operation to normal pressure in order to prevent unintentional reversing of the propeller (20).

5. The hydraulically reversible, adjustable propeller unit according to claim 1, characterized in that provision is made in the control unit (30) in the high-pressure stage for a blade pitch controller (17) permitting stepless setting of the blade pitch during the braking operation in dependence of the servo-pressure.

* * * * *